United States Patent
Kakadia et al.

(10) Patent No.: US 9,723,501 B2
(45) Date of Patent: Aug. 1, 2017

(54) FAULT ANALYTICS FRAMEWORK FOR QOS BASED SERVICES

(71) Applicant: Verizon Patent and Licensing Inc., Arlington, VA (US)

(72) Inventors: Deepak Kakadia, Antioch, CA (US); Carl Recchia, Nazareth, PA (US); Parry C. Booker, Arlington, TX (US); Maqbool Chauhan, Fort Worth, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 368 days.

(21) Appl. No.: 14/479,726

(22) Filed: Sep. 8, 2014

(65) Prior Publication Data
US 2016/0073290 A1    Mar. 10, 2016

(51) Int. Cl.
H04W 24/08    (2009.01)
H04L 12/26    (2006.01)
H04L 12/24    (2006.01)

(52) U.S. Cl.
CPC .............. *H04W 24/08* (2013.01); *H04L 43/08* (2013.01); *H04L 41/0663* (2013.01)

(58) Field of Classification Search
None
See application file for complete search history.

(56) References Cited

U.S. PATENT DOCUMENTS

| | | | |
|---|---|---|---|
| 6,532,554 B1 | 3/2003 | Kakadia | |
| 2011/0151864 A1* | 6/2011 | Byun | H04W 36/30 455/426.1 |
| 2015/0117180 A1* | 4/2015 | Gupta | H04L 41/0663 370/221 |

* cited by examiner

*Primary Examiner* — Michael Thier
*Assistant Examiner* — Yaotang Wang

(57) ABSTRACT

A device may be configured to determine a current state of each of multiple operator network devices that provide a service via an operator network. The device may determine an allowable event at an operator network device based on the current state of the operator network device and model information that models behavior of the operator network device for the service. The device may monitor events at the operator network devices during a session. The device may detect that an allowable event for the operator network device does not occur during the session. The device may determine that a fault occurred at the operator network device during the session based on the allowable event not being detected at the operator network device. The device may provide fault information that indicates the fault occurred at the operator network device.

20 Claims, 8 Drawing Sheets

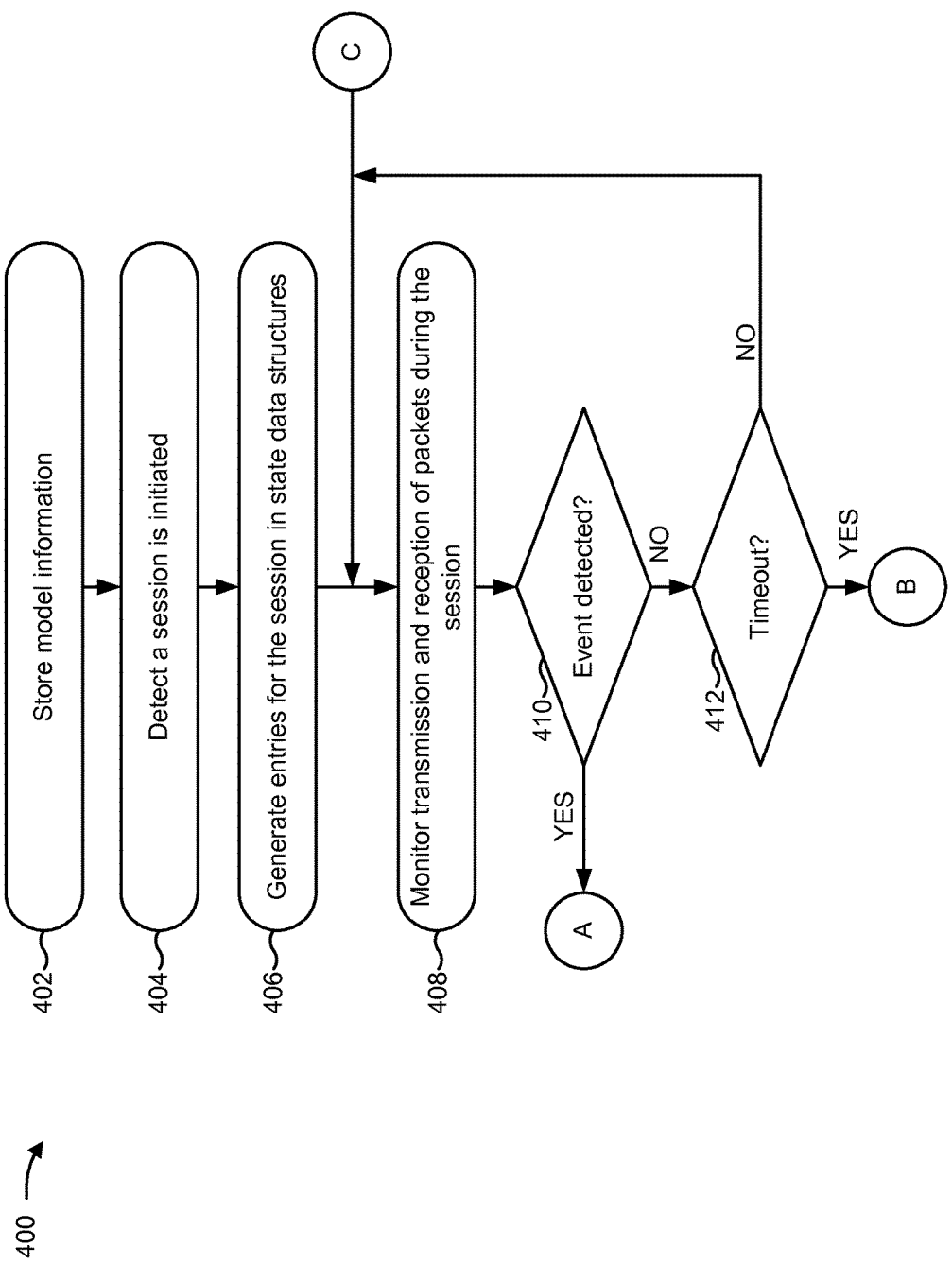

FAULT ANALYTICS FRAMEWORK FOR QOS BASED SERVICES

BACKGROUND

A service provider may provide Quality of Service (QoS) based services to mobile devices via an operator network. For example, the service provider may offer a Voice over Long Term Evolution (VoLTE) that allows voice traffic or calls to be transferred over a Long Term Evolution (LTE) connection.

BRIEF DESCRIPTION OF THE DRAWINGS

FIGS. 4A-4C are flow charts of an example process for identifying a location and a cause of a fault in an operator network.

DETAILED DESCRIPTION OF PREFERRED EMBODIMENTS

The following detailed description of example implementations refers to the accompanying drawings. The same reference numbers in different drawings may identify the same or similar elements.

As service providers deploy more QoS based services, the volume of traffic transmitted over an operator network may increase. Furthermore, managing signaling, protocol verification, and/or timing requirements may become more complex as QoS based services become more commonly used. However, service providers may not be equipped to manage faults that inevitability occur during the use of large scale QoS based services.

For example, it may be difficult for a service provider to identify the location of a problem with a service when the service fails. Currently, a subscriber of the service may call customer service to report a problem with the service. The service provider my dispatch local technicians to set up packet capture devices on operator network devices to log the transmission of packets via the operator network that provides the service. The service provider may attempt to recreate the problem reported by the subscriber so that a record of the problem may be recorded by the packet capture devices. However, recreating the problem may not always be possible. Moreover, even if the problem can be recreated, the technician may have to manually sift through the log of packet transmissions to identify where the problem occurred. Such a solution is not scalable and may not always identify the root cause of the problem.

However, the communication between devices in an operator network that provides a QoS based service is deterministic and specified. Accordingly, the dynamic behavior of the communications between devices in an operator network and an endpoint device (e.g., a client device) may be modeled based on the expected behavior of the devices. The communications between devices may be monitored in real time to determine if the communications deviate from the model. Accordingly, when there is a deviation from the model, a device and/or an event that caused the deviation may be identified. For example, based on the network traffic, corresponding events may be derived and correlated against the model. When the actual events detected to do not correlate against the model, the root cause of a network communication failure may be detected, including between which two devices the failure occurred.

Implementations described herein may monitor an operator network and identify faults in a service provided by an operator network in real time. Moreover, implementations described herein may be scalable so that faults may be efficiently detected even as an operator network and/or a service provided by the operator network grows.

Figure 1:
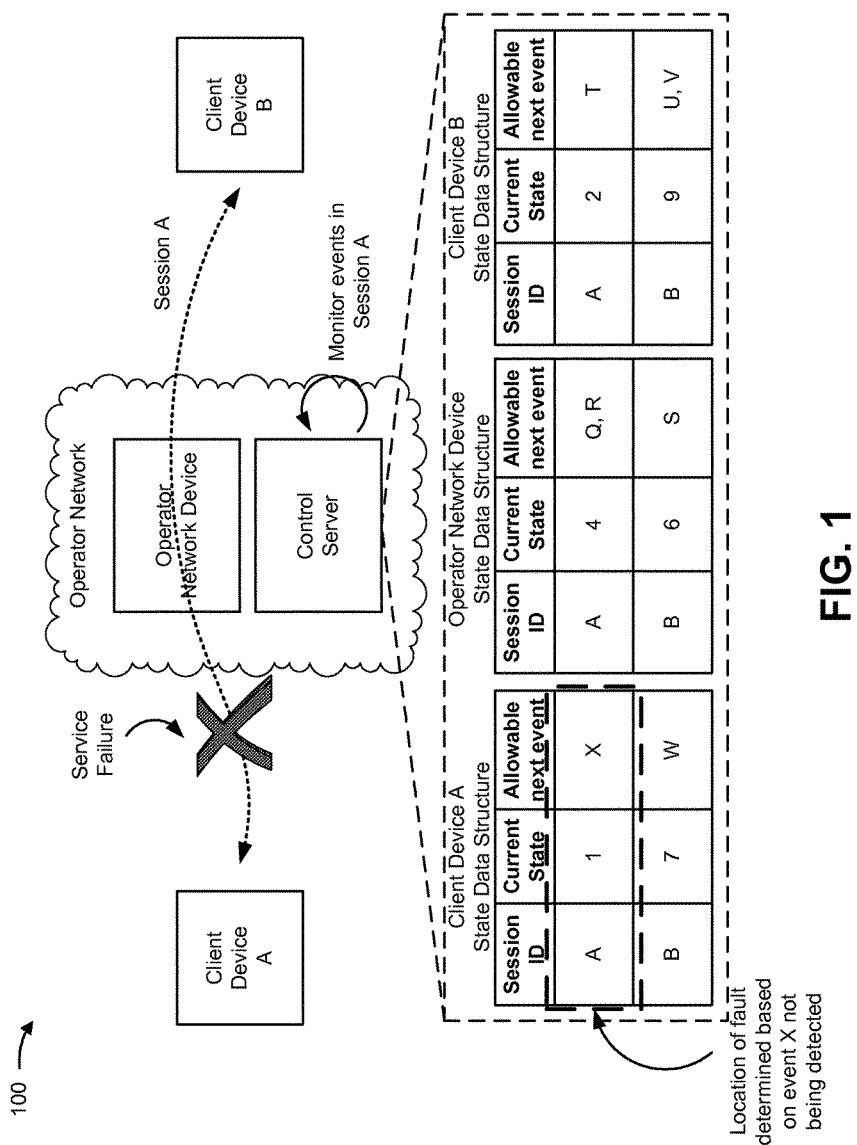
FIG. 1 is a diagram of an overview of an example implementation described herein.

FIG. 1 is a diagram of an overview of an example implementation 100 described herein. In FIG. 1, assume an operator network provides a service (e.g., VoLTE) that allows client device A and client device B to communicate with one another via one or more operator network devices. Further, assume the communication between client device A and client device B via the operator network is deterministic and may be modeled by a control server. For example, the control server may store model information indicating possible states of each of user device A, user device B, and the operator network device while the service is being provided. In some implementations, the model information may also associate allowable next events with each state. In other words, the possible events that are permitted to occur at particular device given a current state of the device may be known in advance. For example, the model information may indicate particular packet(s) that may be sent or received by a device in a particular state. In FIG. 1, the model information may indicate that client device A starts in an initial state 0, then an event Y occurs and client device enters a state 1, then an event X occurs and client device A enters a state 2, and so on.

As shown in FIG. 1, assume user device A and user device B establish a session A to communicate via the service offered by the operator network. The control server may store a state data structure for each of user device A, the operator network device, and user device B that includes an entry for session A and other sessions that may be active (e.g., a session B). Each entry may indicate a current state of a respective device and an allowable next event that may occur at the respective device given the current state of the device.

The control server may monitor the transmission and reception of packets (e.g., events) between user device A, the operator network device, and user device B in real by non-intrusively tapping the network and sniffing the packets. Each time an event is detected, the control server may compare the detected event with an allowable next event indicated by the state data structure for the device at which the event was detected.

If the detected event matches an allowable next event, the control server may update the current state of the device indicated by the state data structure based on the event. The control server may also update the allowable next events indicated by the state data structure based on the updated current state of the device. On the other hand, if an allowable next event is not detected at a respective device, the control server may determine that a fault occurred at the device that causes a failure in the service.

For example, as shown in FIG. 1, assume there is a fault in session A that causes the service to fail. Further, assume user device A is currently in state 1 and has an allowable next event of X. For example, assume event X is receiving a particular message from the operator network device. Further, assume that the control server detects that the operator network device actually sends the particular message to client device A, and thus client device A is expected to receive the particular message (e.g., event X is expected). The control server may determine that the location of the fault is at user device A (as opposed to at the operator network device or user device B) based on an event other than allowable event X being detected at user device A, and/or event X is not being detected at user device A within a timeout time.

In this way, the location and cause of a service failure may be determined in real time without having to attempt to recreate the failure after the fact. Additionally, further granularity may be achieved by adding more instrumentation in an increased granular manner if there are other operator network devices between the operator network device and client device A.

Figure 2:
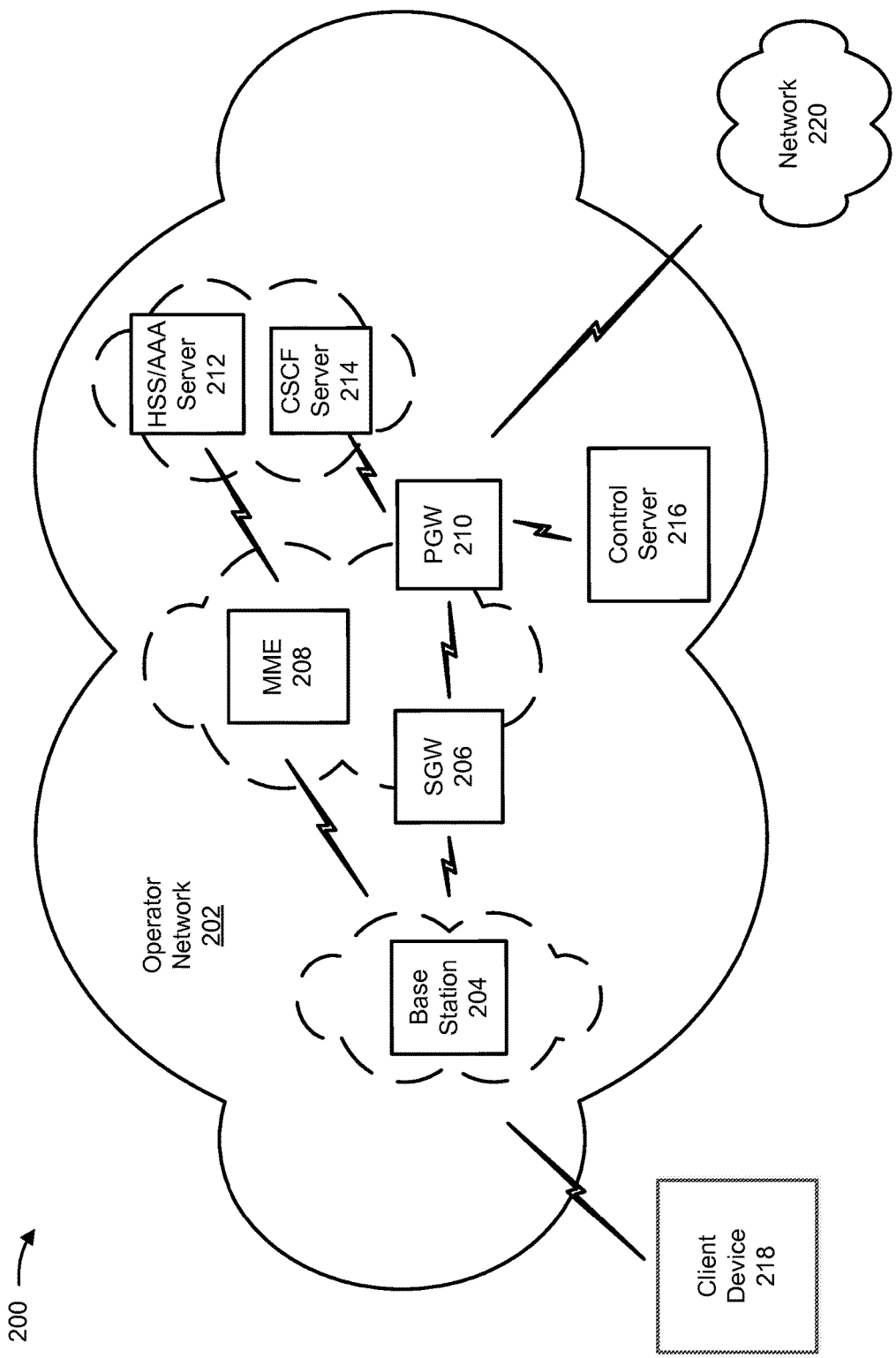
FIG. 2 is a diagram of an example environment in which systems and/or methods, described herein, may be implemented.

FIG. 2 is a diagram of an example environment 200 in which systems and/or methods described herein may be implemented. As shown in FIG. 2, environment 200 may include an operator network 202. The operator network 202 may include a base station 204, a serving gateway 206 (hereinafter referred to as "SGW 206"), a mobility management entity device 208 (hereinafter referred to as "MME 208"), a packet data network (PDN) gateway 210 (hereinafter referred to as "PGW 210"), a home subscriber server (HSS)/authentication, authorization, accounting (AAA) server 212 (hereinafter referred to as "HSS/AAA server 212"), a call session control function (CSCF) server 214 (hereinafter referred to as "CSCF server 214"), and/or a control server 216. Environment 200 may also include a client device 218 and/or a network 220.

Operator network 202 may include an evolved packet system (EPS) that includes a long term evolution (LTE) network and/or an evolved packet core (EPC) that operate based on a third generation partnership project (3GPP) wireless communication standard. The LTE network may be a radio access network (RAN) that includes one or more base stations, such as eNodeBs (eNBs), via which client device 218 communicates with the EPC. The EPC may include SGW 206, MME 208, and/or PGW 210 that enables client device 218 to communicate with network 220 and/or an Internet protocol (IP) multimedia subsystem (IMS) core. The IMS core may include HSS/AAA server 212 and/or CSCF server 214 and may manage certain information and services, such as authentication, session initiation, account information, and/or a user profile, associated with client device 218. The LTE network may include multiple base stations 204, and the EPC may include multiple SGWs 206, MMEs 208, and/or PGWs 210. Additionally, or alternatively, operator network 202 may include a cellular network, a public land mobile network (PLMN), a second generation (2G) network, a third generation (3G) network, a fourth generation (4G) network, a fifth generation (5G) network, and/or another network.

Base station 204 may include one or more network devices that receive, process, and/or transmit traffic, such as audio, video, text, and/or other data, destined for and/or received from client device 218. In an example implementation, base station 204 may be an eNB device and may be part of the LTE network. Base station 204 may receive traffic from and/or send traffic to network 220 via SGW 206 and PGW 210. Base station 204 may send traffic to and/or receive traffic from client device 218 via an air interface. One or more of base stations 204 may be associated with a RAN, such as the LTE network.

SGW 206 may include one or more network devices, or other types of computation or communication devices, that gather, process, search, store, and/or provide information in a manner described herein. SGW 206 may include one or more data processing and/or traffic transfer devices, such as a gateway, a router, a modem, a switch, a firewall, a network interface card (NIC), a hub, a bridge, a proxy server, an optical add-drop multiplexer (OADM), or some other type of device that processes and/or transfers traffic. SGW 206 may, for example, aggregate traffic received from one or more base stations 204 and may send the aggregated traffic to network 220 via PGW 210. In some example implementations, SGW 206 may route and forward data, may act as a mobility anchor for a user plane during inter-base station handovers, and may act as an anchor for mobility between LTE and other 3GPP technologies.

MME 208 may include one or more computation or communication devices that gather, process, search, store, and/or provide information in a manner described herein. For example, MME 208 may perform operations associated with a handoff to and/or from the EPS. MME 208 may perform operations to register client device 218 with the EPS, to handoff client device 218 from the EPS to another network, to handoff client device 218 from the other network to the EPS, and/or to perform other operations. MME 208 may perform policing operations for traffic destined for and/or received from client device 218.

PGW 210 may include one or more network devices that gather, process, search, store, and/or provide information in a manner described herein. PGW 210 may include one or more data processing and/or traffic transfer devices, such as a gateway, a router, a modem, a switch, a firewall, a NIC, a hub, a bridge, a proxy server, an OADM, or some other type of device that processes and/or transfers traffic. PGW 210 may, for example, provide connectivity of client device 218 to external packet data networks, such as network 220, by being a traffic exit/entry point for client device 218. PGW 210 may perform policy enforcement, packet filtering, charging support, lawful intercept, and packet screening. PGW 210 may also act as an anchor for mobility between 3GPP and non-3GPP technologies. PGW 210 may authenticate client device 218 (e.g., via interaction with HSS/AAA server 212).

HSS/AAA server 212 may include one or more server devices, or other types of computation or communication devices, that gather, process, search, store, and/or provide information in a manner described herein. For example, HSS/AAA server 212 may manage, update, and/or store, in a memory associated with HSS/AAA server 212, profile information associated with client device 218 that identifies applications and/or services that are permitted for and/or accessible by client device 218, bandwidth or data rate thresholds associated with the applications or services, information associated with a user of client device 218 (e.g., a username, a password, a personal identification number (PIN), etc.), a data plan, rate information, minutes allowed, and/or other information. Additionally, or alternatively, HSS/AAA server 212 may include a device that performs authentication, authorization, and/or accounting (AAA) operations associated with a communication session with client device 218. With regard to the authentication operation, HSS/AAA server 212 may verify a device's (e.g., client device 218) specific digital identity provided via an identifier (e.g., a password, a digital certificate, a phone number, etc.) associated with the device. With regard to the authorization function, HSS/AAA server 212 may grant or refuse privileges to a device (e.g., client device 218) for accessing specific services (e.g., IP address filtering, address assignment, route assignment, quality of service (QoS), etc.). With regard to the accounting operation, HSS/AAA server 212 may track consumption of network resources (e.g., by client device 218) and may use this information for management, planning, billing, or the like.

CSCF server 214 may include one or more server devices, or other types of computation or communication devices, that gather, process, search, store, and/or provide information in a manner described herein. CSCF server 214 may process and/or route calls to and from client device 218 via the EPC. For example, CSCF server 214 may process calls, received from network 220, that are destined for client device 218. In another example, CSCF server 214 may process calls, received from client device 218, that are destined for network 220.

CSCF server 214 may also include a policy and charging rules function (PCRF) that may perform operations that enforce EPS policies associated with a communication session with client device 218. For example, the PCRF may dynamically provide real-time bandwidth allocations and/or controls (e.g., associated with a particular access point name (APN)) associated with particular applications, network accesses, and/or services provided to client device 218 during a communication session. The PCRF may also dynamically provide a real-time signal flow policy to adapt to changing conditions within the network and/or to manage traffic flow during the communication session.

Control server 216 may include one or more server devices, or other types of computational or communication devices, that gather, process, search, store, and/or provide information in a manner described herein. Additionally, or alternatively, control server 216 may include a communication interface that allows control server 216 to receive information from and/or transmit information to other devices in environment 200. In some implementations, control server 216 may use a packet tracer to track packets received by and sent from devices of environment 200.

Client device 218 may include any computation or communication device, such as a communication device that is capable of communicating with a network (e.g., network 220) and/or an operator network (e.g., operator network 202). For example, client device 218 may include a radiotelephone, a personal communications system (PCS) terminal (e.g., that may combine a cellular radiotelephone with data processing and data communications capabilities), a smart phone, a computer, a laptop, a tablet computer, a server, a camera, a gaming device, a machine-to-machine (M2M) device, and/or another type of mobile, computation, or communication device.

Network 220 may include one or more wired and/or wireless networks. For example, network 218 may include a cellular network, a PLMN, a 2G network, a 3G network, a 4G network, a 5G network, and/or another type of network. Additionally, or alternatively, network 218 may include a wide area network (WAN), a metropolitan network (MAN), a telephone network (e.g., the Public Switched Telephone Network (PSTN)), an ad hoc network, an intranet, the Internet, a fiber optic-based network, and/or combination of these or other types of networks.

The number and arrangement of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
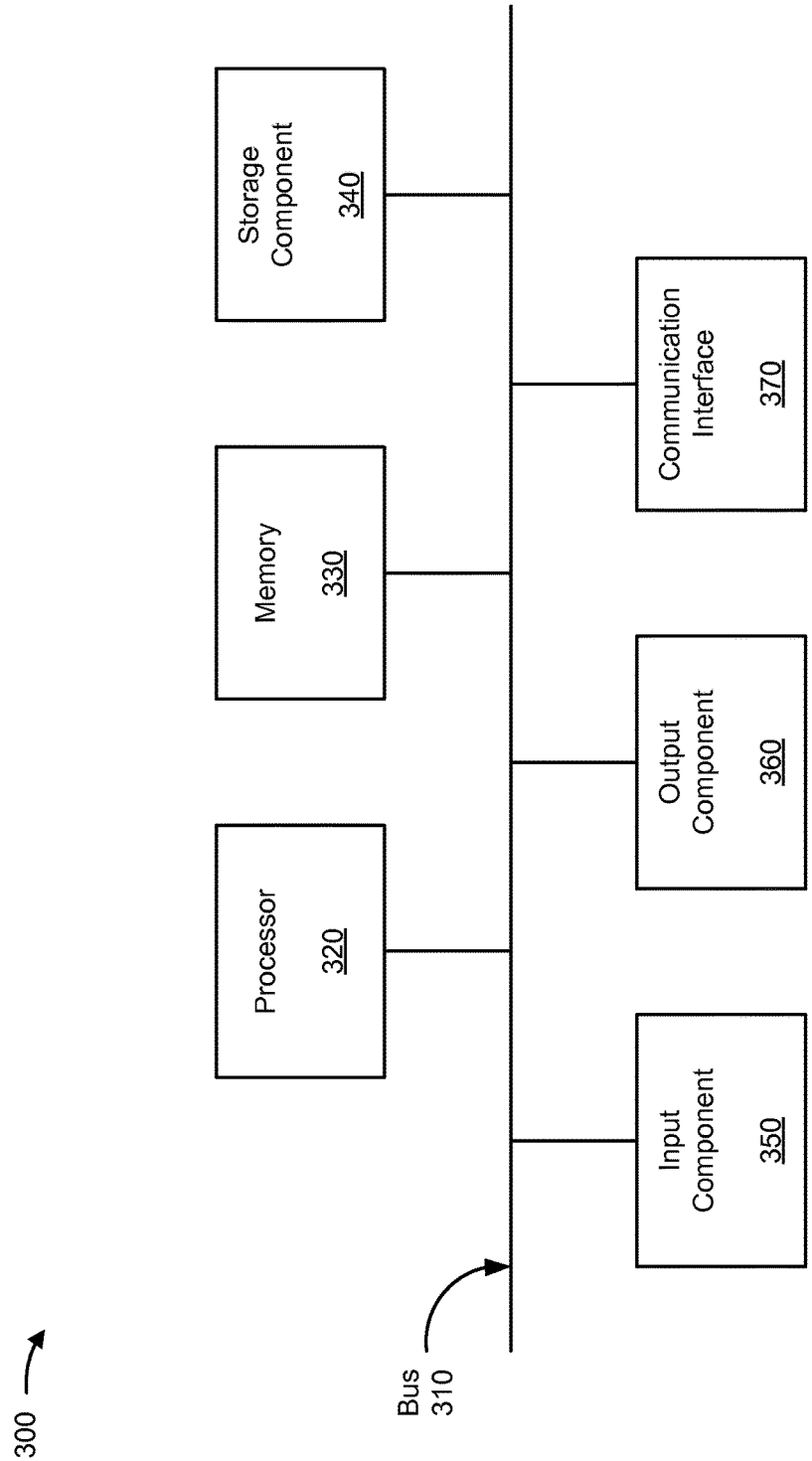
FIG. 3 is a diagram of example components of one or more devices of FIG. 2.

FIG. 3 is a diagram of example components of a device 300. Device 300 may correspond to base station 204, SGW 206, MME 208, PGW 210, HSS/AAA server 212, CSCF server 214, control server 216, and/or client device 218. In some implementations, base station 204, SGW 206, MME 208, PGW 210, HSS/AAA server 212, CSCF server 214, control server 216, and/or client device 218 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 is provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4B:
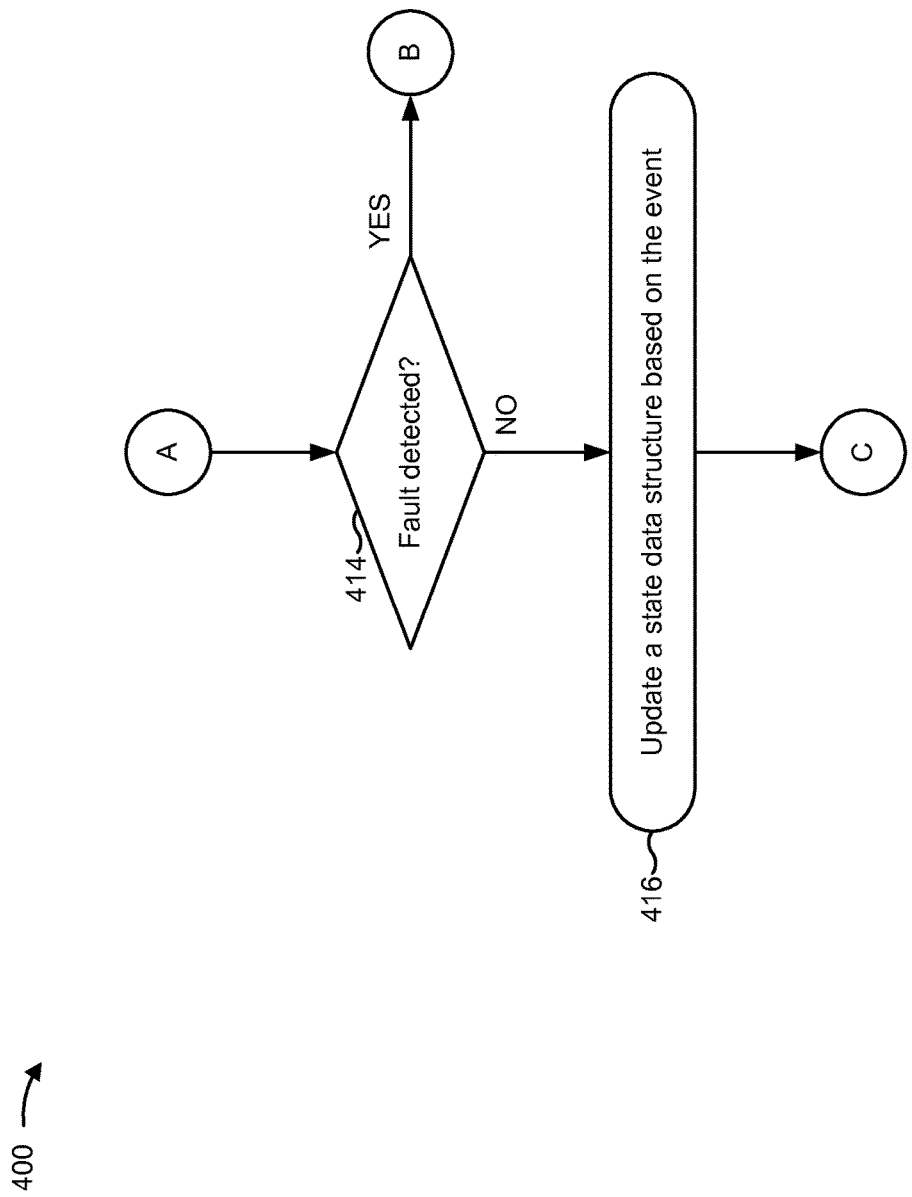
Figure 4C:
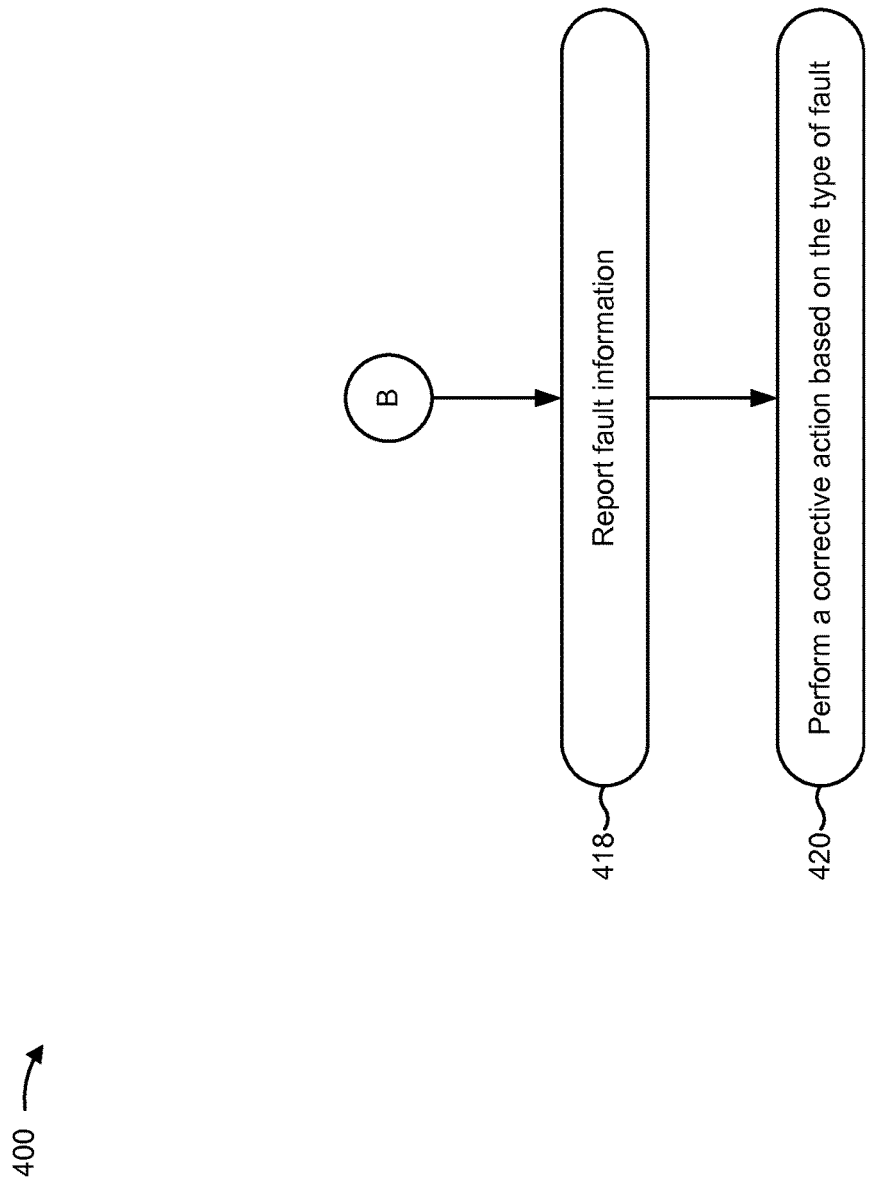

FIGS. 4A-4C are flow charts of an example process 400 for identifying a location and a cause of a fault in operator network 202. In some implementations, one or more process blocks of FIGS. 4A-4C may be performed by control server 216. Additionally, or alternatively, one or more process blocks of FIGS. 4A-4C may be performed by another device or a group of devices separate from or including control server 216, such as base station 204, SGW 206, MME 208, PGW 210, HSS/AAA server 212, CSCF server 214, and/or client device 218.

As used herein, the term "operator network device" may refer to base station 204, SGW 206, MME 208, PGW 210, HSS/AAA server 212, CSCF server 214, and/or another device included in operator network 202.

As shown in FIG. 4A, process 400 may include storing model information (block 402). For example, control server 216 may store the model information in a memory included in or accessible by control server 216. The model information may indicate a model of deterministic communications between operator network devices and/or client device 218. In other words, the model information may indicate expected or allowed behavior of each network operator device and/or client device 218 while a service is provided.

An operator network device and/or client device 218 may operate like a state machine that switches between different states. A state may be a status of the operator network device and/or client device 218 at a particular time. Each service that the operator network device and/or client device 218 provides may be associated with multiple possible states. A service may be associated with a type of network traffic being processed by operator network device and/or client device 218. In some implementations, the service may be a QoS based service. For example, a service may include a VoIP service, a streaming media service, a videoconferencing service, a data transfer service, etc. An event (e.g., receiving a packet, transmitting a packet, processing a packet, etc.) may cause the operator network device and/or client device 218 to switch between different states.

Each state may be associated with one or more allowable events. In other words, when an operator network device and/or client device 218 is in a given state, the model may indicate that there are particular events that may be allowed or expected to occur based on the given state and the service being provided. Each event causes the operator network device and/or client device 218 to enter into a different state.

Control server 216 may store model information corresponding to one or more operator network devices (e.g., base station 204, SGW 206, MME 208, PGW 210, HSS/AAA server 212, and/or CSCF server 214) and/or client device 218. In some implementations, the model information may be different for different operator network devices. For example, the model information for base station 204 may be different than the model information for SGW 206 because base station 204 and SGW 206 may be associated with different states, different events, and/or different services.

The model information corresponding to each operator network device and/or client device 218 may indicate one or more services that may be provided by the operator network device and/or client device 218. For each service, the model information may indicate possible states for the operator network device and/or client device 218. For example, the model information may include a list of possible states that the operator network device and/or client device 218 may be in while an associated service is being provided.

For each state, the model information may indicate one or more allowable events that may occur when the operator network device and/or client device 218 is in the state. For example, the model information may indicate one or more kinds of messages that the operator network device and/or client device 218 may be allowed to transmit or receive while in a particular state. The states and/or events may include states and/or events at different protocol levels (e.g., a data link layer, a network layer, a transport layer, etc.).

Additionally, or alternatively, for each state, the model information may indicate a timeout time. The timeout time may indicate a maximum amount of time to wait for an event to occur while in a particular state before a fault is triggered. For example, if an expected message is not received within the timeout time, a fault may be triggered. In some implementations, multiple timeout times may be associated with a state, where each timeout time is associated with a QoS level. In other words, a same state for a same service may have separate timeout times for different QoS levels.

For each event, the model information may indicate a state that the event causes the operator network device and/or client device 218 to enter based on the event occurring.

As further shown in FIG. 4A, process 400 may include detecting that a session is initiated (block 404). For example, control server 216 may detect that the session is initiated by client device 218.

Client device 218 may send an initiation message to operator network 202 that requests to initiate a session (e.g., a communication session) with another device (e.g., another client device 218, a server device, etc.) via operator network 202. The initiation message may indicate a type of service requested (e.g., a VoLTE service, a hypertext transfer protocol (HTTP) service, a streaming media service, etc.), source device information (e.g., an IP address and/or a port identifier of client device 218 that sent the initiation message), destination device information (e.g., an IP address and/or a port identifier of the other device), and/or QoS information that indicates a QoS level associated with the requested session.

An operator network device may receive the initiation message and operator network 202 may initiate a session based on receiving the initiation message. The initiation message may be routed through control server 216 by operator network 202 and/or control server 216 may use a packet tracer (e.g., an application, a command, and/or a program that tracks a transfer of packets in operator network 202) to detect the initiation message is received from client device 218 and that the session has been initiated.

As further shown in FIG. 4A, process 400 may include generating entries for the session in state data structures corresponding to operator network devices and/or client device 218 (block 406). For example, control server 216 may generate the entries for the session in the state data structures.

Control server 216 may store state data structures for one or more operator network devices and/or client device(s) 218 included in the session. Each state data structure may include one or more entries that each associate a session identifier, a current state identifier, an allowable next event identifier(s), and/or a timeout time. An operator network device and/or client device 218 may have multiple sessions active at a same time and may have a separate entry for each session in the state data structure. The session identifier may identify a session. The current state identifier may indicate a current state of the operator network device and/or client device 218 for the session. The allowable next event identifier(s) may indicate one or more events that are permitted to take place while the operator network device and/or client device 218 is in the current state. The timeout time may indicate a maximum amount of time that the operator network device and/or client device 218 may wait for an allowable event to take place before a fault is triggered.

Control server 216 may create an entry in each state data structure for the initiated session. For example, control server 216 may create an entry for the session in a state data structure for a source client device 218, a destination client device 218, base station 204, SGW 206, MME 208, PGW 210, HSS/AAA server 212, and/or CSCF server 214.

Each entry may be initially populated based on the model information and the initiation message. For example, the initiation message may indicate a type of service for the session. Control server 216 may identify model information associated with that type of service for the operator network device and/or client device 218. The model information may indicate an initial state and allowable events associated with the initial state that may be used to populate the state data structure. Additionally, or alternatively, the initiation message may indicate a QoS level for the session, and control server 216 may identify a timeout time, associated with the QoS level and the initial state, to populate the state data structure.

As further shown in FIG. 4A, process 400 may include monitoring transmission and reception of packets during the session (block 408). For example, control server 216 may monitor the transmission and the reception of packets using a packet tracer. Additionally, or alternatively, packets routed through operator network 202 may be routed through control server 216 so that control server 216 may monitor the packets.

In some implementations, control server 216 may monitor that a packet is sent by an operator network device and/or client device 218 in real time. Additionally, or alternatively, control server 216 may monitor that a packet is received by an operator network device and/or client device 218 in real time or near real time. Each transmission or reception of a packet may correspond to an event.

As further shown in FIG. 4A, process 400 may include determining if an event is detected (block 410). For example, control server 216 may determine if an event is detected based on monitoring the transmission and the reception of packets.

Control server 216 may determine that an event is detected when control server 216 detects a packet for the session is transmitted or received by an operator network device and/or client device 218. On the other hand, control server may determine that an event is not detected when control server 216 does not detect that a packet, for the session, is transmitted or received by an operator network device and/or client device 218.

As further shown in FIG. 4A, if an event is not detected (block 410—no), process 400 may include determining if a timeout time has expired without detecting an event (block 412). For example, control server 216 may determine if a timeout time has expired at an operator network device and/or client device 218.

Control server 216 may identify a timeout time for each operator network device and/or client device 218 from the state data structures.

Control server 216 may determine that a timeout time has expired at an operator network device and/or client device 218 if an amount of time equal to or greater than the timeout time has passed without an event being detected at the operator network device and/or client device 218.

Control server 216 may determine that a timeout time has not expired at an operator network device and/or client device 218 if an amount of time less than the timeout time has passed without an event being detected at the operator network device and/or client device 218.

If control server 216 determines that a timeout time has not expired (block 412—no), process 400 may return to block 408 to continue to monitor the transmission and reception of packets.

As shown in FIG. 4A, if an event is detected (block 410—yes), process 400 may include determining if a fault is detected based on the event (block 414) (FIG. 4B). For example, control server 216 may determine if a fault is detected based on comparing the detected event to allowable events indicated by the state data structure. Monitoring events and determining faults in real time or near real time when the session is active may provide a scalable solution to identify faults.

If the event detected at the operator network device and/or client device 218 does not match an allowable event for the operator network device and/or client device 218 for the current state of the operator network device and/or client device 218, then control server 216 may determine that a fault is detected.

On the other hand, if the event detected at the operator network device and/or client device 218 matches an allowable event for the operator network device and/or client device 218 for the current state of the operator network device and/or client device 218, then control server 216 may determine that a fault is not detected.

In some implementations, control server 216 may determine if a fault is detected using a Communicating Sequential Process (CSP). The CSP may define rules for expected events for each state and/or event. For example, a CSP rule may indicate that a particular event is expected to be detected at an operator network device within a timeout time based on a preceding event being detected at the operator network device. If a detected event does not conform to a CSP rule, a fault may be detected. On the other hand, if a detected event conforms to a CSP rule, then a fault may not be detected.

As further shown in FIG. 4B, if a fault is not detected (block 414—no), process 400 may include updating a state data structure based on the event (block 416). For example, control server 216 may update a state data structure for the operator network device and/or client device 218 at which the event took place based on the event and the model information.

Control server 216 may identify an updated current state of the operator network device and/or client device 218 at which the event took place based on the event, the model information, and/or the service being provided by the session. For example, the model information may indicate a state for the operator network device and/or client device 218 associated with the particular event taking place and the service. Control server 216 may update the current state identifier in the state data structure to indicate the updated current state of the operator network device and/or client device 218.

Control server 216 may identify an updated allowable next event(s) for the operator network device and/or client device 218 at which the event took place based on the updated current state and the model information. For example, the model information may indicate allowable next events for the updated current state. Control server 216 may update the allowable next event(s) indicated by the state data structure to indicate the updated allowable next events.

Control server 216 may identify an updated timeout time based on the updated current state of the operator network device and/or client device 218 at which the event took place, the QoS level of the session, and/or the service being provided by the session. For example, the model information may indicate a timeout time associated with the updated current state, the QoS level, and the service. Control server 216 may update the timeout time indicated by the state data structure to indicate the updated timeout time.

Once the state data structure has been updated for the operator network device and/or client device 218 at which the event took place, process 400 may return to block 408 to continue to monitor the transmission and reception of packets.

If a timeout time has expired (block 412—yes) (FIG. 4A) or a fault is detected (block 414—yes) (FIG. 4B), process 400 may include reporting fault information (block 418) (FIG. 4C). For example, control server 216 may report the fault information by sending fault information to another device (e.g., a device operated by a user responsible for managing operator network 202) and/or presenting the fault information to a user of control server 216.

In some implementations, the fault information may indicate a device responsible for the fault. For example, the fault information may indicate an operator network device and/or client device 218 is responsible for the fault based on a timeout time expiring and/or a non-permitted event taking place at the operator network device and/or client device 218. In this way, control server 216 may report an exact location of the fault so that the fault may be easily fixed.

Additionally, or alternatively, the fault information may indicate an event that caused the fault. For example, the fault information may indicate a non-permitted event that took place at an operator network device and/or client device 218. In this way, control server 216 may report an exact cause of the fault so that the fault may be easily fixed.

In some implementations, the fault information may indicate an expected event that did not take place. For example, control device 216 may detect that a packet is sent from a first operator network device to a second operator network device (e.g., a first event). Accordingly, control device 216 may expect that the packet would be received by the second operator network device (e.g., a second event). However, if a timeout time expires without the second operator network device receiving the packet, then control device 216 may determine that the second event (e.g., the second operator network receiving the packet) did not take place. Thus, the fault information may indicate that the second operator network device did not receive the packet even though the packet was sent to the second operator network device. In this way, the location of the fault can be narrowed down to the second operator network device or a connection between first operator network device and the second operator network device.

In some implementations, control server 216 may store state data structures for client devices 218 and/or operator network devices in a particular region. However, a session may involve client devices 218 and/or operator network devices in other regions managed by other control servers 216. Accordingly, control server 216 by itself may not be able to determine the location of a fault during the session if the fault occurred between two regions managed by different control servers 216. Accordingly, in some implementations, a first control server 216 that manages a first region and a second control server 216 that manages a second region may compare a state data structure of a first operator network device in the first region to a state data structure of an operator network device in the second region to determine if a fault occurred between the regions. For example, the first control server 216 and the second control server 216 may determine that a packet sent by the first operator network device in the first region was not received by the second operator network device in the second region. Accordingly, the first and second control servers 216 may determine that the fault occurred at a router in a core network that connects the two regions.

As further shown in FIG. 4C, process 400 may include performing a corrective action based on the type of fault (block 420). For example, control server 216 may perform the corrective action and/or cause the corrective action to be performed.

In some implementations, it may be possible for control server 216 to take a corrective action automatically to correct a problem that caused the fault and to prevent the session from being terminated due to the fault. For example, control server 216 may route the session through different operator network devices to avoid an operator network device where a fault is detected.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
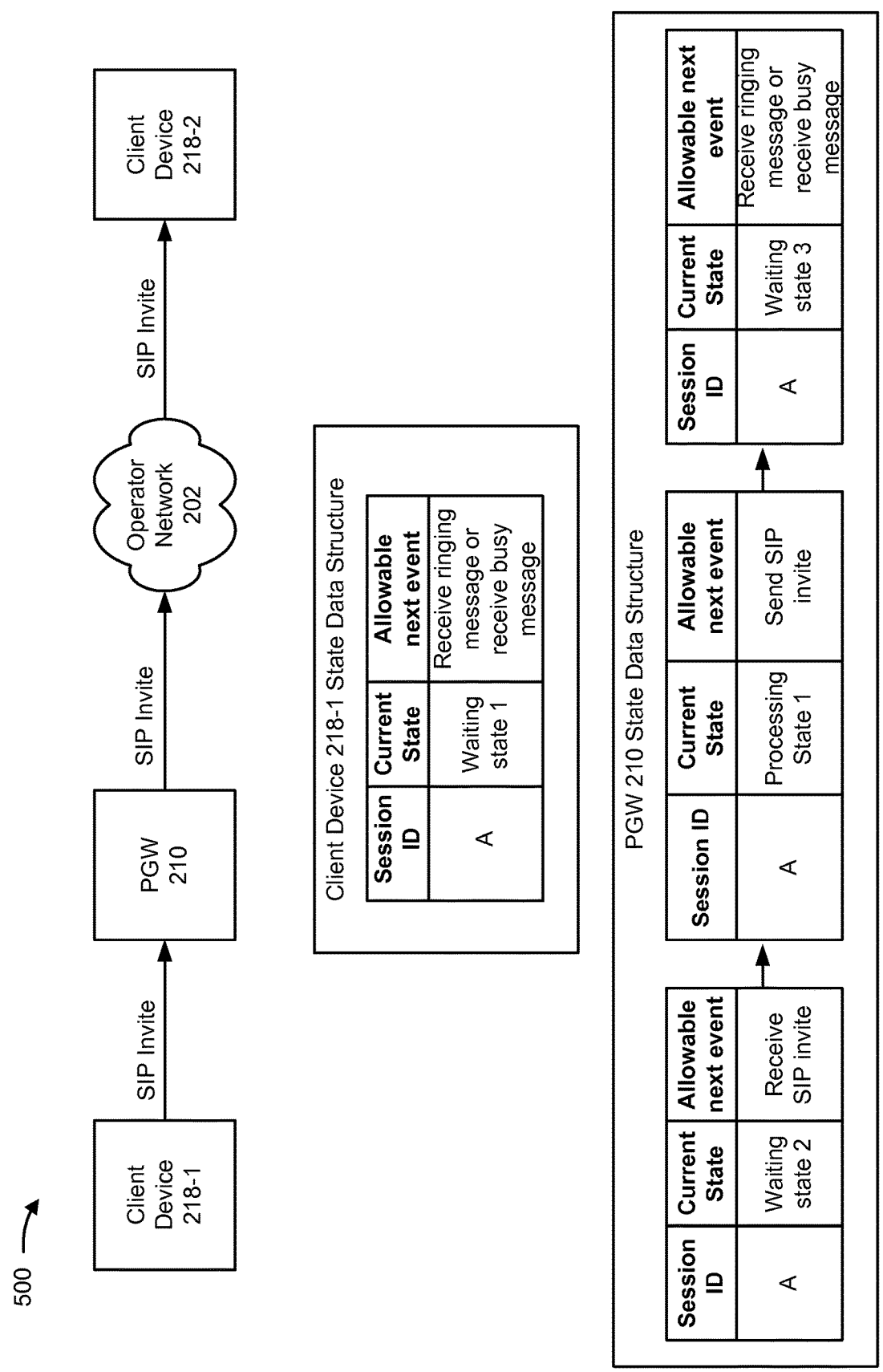
FIGS. 5A and 5B are diagrams of an example implementation relating to the example process shown in FIGS. 4A-4C.
Figure 5B:
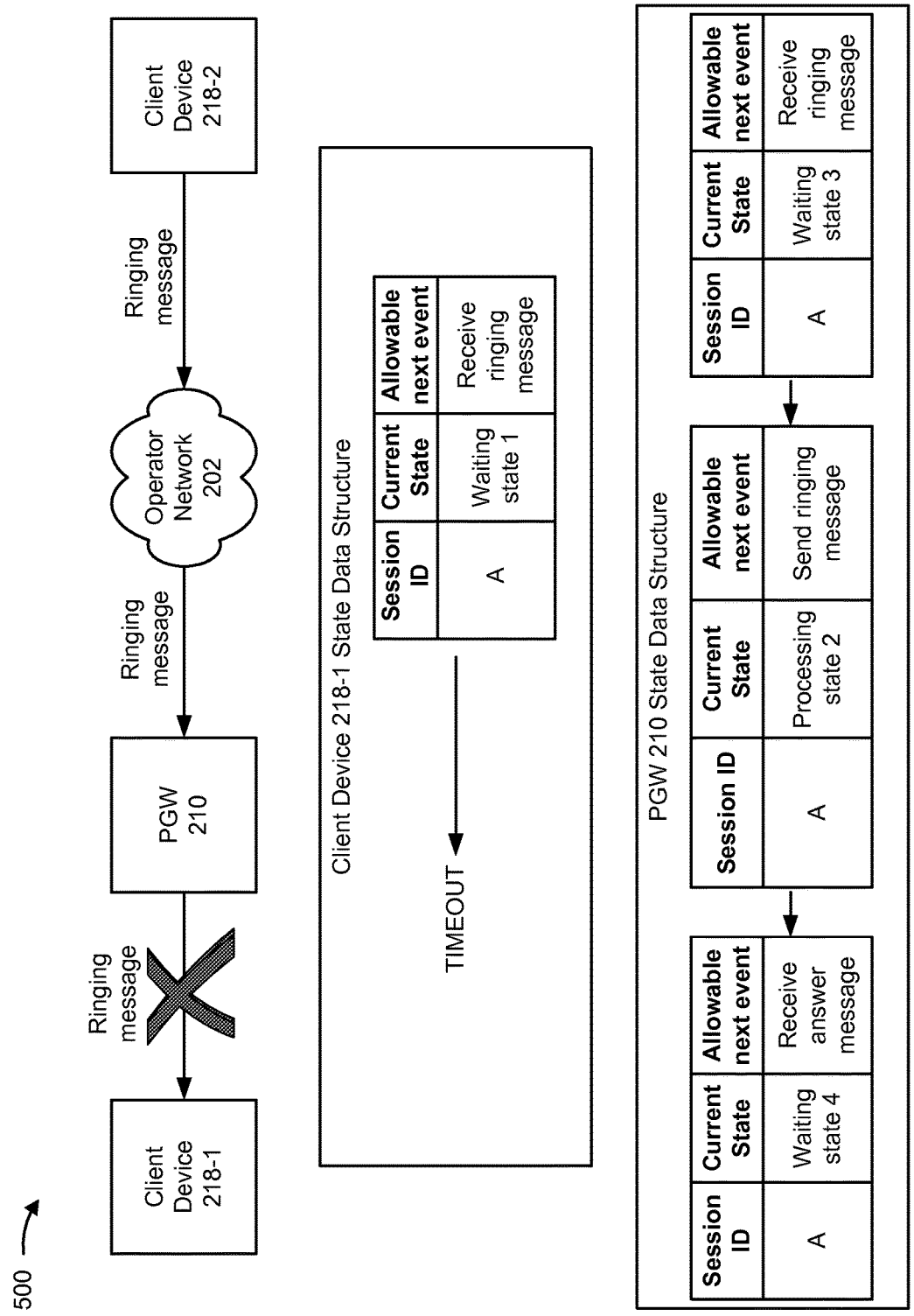

FIGS. 5A and 5B are diagrams of an example implementation 500 relating to example process 400 shown in FIG. 4. FIGS. 5A and 5B show an example of identifying a location and a cause of a fault in operator network 202.

As shown in FIG. 5A, assume a client device 218-1 initiates a VoLTE session A by sending a session initiation protocol (SIP) invite to PGW 210 (e.g., via base station 204 and SGW 206). Control server 216 may detect that session A has been initiated and create an entry for session A in a user device 218-1 state data structure and an entry for session A in a PGW 210 state data structure.

As further shown in FIG. 5A, control server 216 may populate the user device 218-1 state data structure to indicate that user device 218-1 is currently in a waiting state 1 and that allowable next events include receiving a ringing message or receiving a busy message. Further, assume a timeout time is associated with receiving the ringing message or receiving the busy message.

As further shown in FIG. 5A, control server 216 may populate the PGW 210 state data structure to indicate that PGW 210 is in a waiting state 2 and that an allowable next event includes receiving the SIP invite.

Assume PGW 210 receives the SIP invite from user device 218-1 and that control server 216 detects the event of PGW 210 receiving the SIP invite. Control server 216 may determine that the detected event (e.g., receiving the SIP invite) is an allowable event based on comparing the detected event with allowable next events indicated by the PGW 210 state data structure. Control server 216 may update the PGW 210 state data structure based on the detected event to indicate that PGW 210 is currently in a processing state and that an allowable next event is to send the SIP invite.

Assume PGW 210 sends the SIP invite to another operator network device included in operator network 202 and that control server 216 detects the event of PGW 210 sending the SIP invite. Control server 216 may determine that the detected event (e.g., sending the SIP invite) is an allowable event based on comparing the detected event with the allowable next event indicated by the PGW 210 state data structure. Control server 216 may update the PGW 210 state data structure based on the detected event to indicate that PGW 210 is currently in a waiting state 3 and that an allowable next event is to receive a ringing message or to receive a busy message.

In FIG. 5A, assume the SIP invite is routed to client device 218-2 via other operator network devices and that client device 218-2 receives the SIP invite. Although not illustrated in FIG. 5A, control server 216 may monitor events at the other operator network devices and update state data structures for the other operator network devices.

In FIG. 5B, assume client device 218-2 sends a ringing message to operator network 202 in response to the SIP invite. Assume that the ringing message is routed to PGW 210, that PGW 210 receives the ringing message, and that control server 216 detects the event of PGW 210 receiving the ringing message. Control server 216 may determine that the detected event (e.g., receiving the ringing message) is an allowable event based on comparing the detected event with the allowable next event indicated by the PGW 210 state data structure. Control server 216 may update the PGW 210 state data structure based on the detected event to indicate that PGW 210 is currently in a processing state 2 and that an allowable next event is to send the ringing message.

Assume PGW 210 sends the ringing message to user device 218-1 included in operator network 202 and that control server 216 detects the event of PGW 210 sending the ringing message. Control server 216 may determine that the detected event (e.g., sending the ringing message) is an allowable event based on comparing the detected event with the allowable next event indicated by the PGW 210 state data structure. Control server 216 may update the PGW 210 state data structure based on the detected event to indicate that PGW 210 is currently in a waiting state 4 and that an allowable next event is to receive an answer message (e.g., from user device 218-2 indicating that user device 218-2 has answered the VoLTE call).

Assume client device 218-1 does not receive the ringing message sent by PGW 210. Further, assume control server 216 detects that client device 218-1 has not received the ringing message or the busy message within the timeout time. Accordingly, control server 216 may determine that a fault occurred at client device 218-1 and/or the connection between PGW 210 and user device 218-1 based on the ringing message being sent by PGW 210 but not received by client device 218-1.

Thus, the state data structures may indicate a location of the fault (e.g., at user device 218-1) and a cause of the fault (e.g., failure to receive ringing message within timeout time) and control server 216 may report fault information indicating the location and the cause of the fault.

In this way, the location and the cause of a fault during the VoLTE session may be precisely identified in real time or near real time.

As indicated above, FIGS. 5A and 5B are provided merely as an example. Other examples are possible and may differ from what was described with regard to FIGS. 5A and 5B.

Implementations described herein may monitor an operator network and identify faults in a service provided by an operator network in real time. Moreover, implementations described herein may be scalable so that faults may be efficiently detected even as an operator network and/or a service provided by the operator network grows.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

As used herein, a packet may refer to a network packet, a frame, a datagram, a segment, a fragment of a packet, a fragment of a frame, a fragment of a datagram, a fragment of a segment, or any other formatted or unformatted unit of data capable of being transmitted via a network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more processors to:
  determine a current state of each of a plurality of operator network devices that provide a Quality of Service (QoS) based service via an operator network,
    the current state being associated with a session between the operator network and a client device,
  determine at least one allowable event at a particular operator network device, of the plurality of operator network devices, based on a current state of the particular operator network device and based on model information,
    the model information indicating allowed behavior of the particular operator network device for the QoS based service;
  monitor events at the plurality of operator network devices during the session;
  detect, based on monitoring the events, that an allowable event, of the at least one allowable event, does not occur at the particular operator network device before a timeout time expires,
    the timeout time indicating an amount of time for the allowable event to occur before a fault is triggered, and
    the timeout time being based on a QoS level of the session;
  determine that the fault occurred at the particular operator network device during the session based on the allowable event not being detected at the particular operator network device before the timeout time expires; and
  provide fault information that indicates the fault occurred at the particular operator network device.

2. The device of claim 1, where the at least one allowable event includes at least one of receiving a first packet or sending a second packet.

3. The device of claim 1, where the one or more processors, when monitoring the events, are to:
monitor the events in real time.

4. The device of claim 1, where the one or more processors are further to:
detect that an unallowable event occurs; and
where the one or more processors, when determining that the fault occurred, are further to:
  determine that the fault occurred based on the unallowable event occurring instead of the allowable event.

5. The device of claim 1, where the one or more processors are further to:
cause a corrective action, based on the fault, to be performed,
  the corrective action causing a problem that caused the fault to be corrected.

6. The device of claim 1, where the timeout time is separate for different QoS levels.

7. The device of claim 1, where the timeout time is one of multiple timeout times associated with the current state.

8. A computer-readable medium storing instructions, the instructions comprising:
one or more instructions that, when executed by one or more processors, cause the one or more processors to:
  determine a current state of a client device and one or more operator network devices that provide a Quality of Service (QoS) based service via an operator network,
    the current state being associated with a session between the operator network and the client device;
  determine at least one allowable event at a particular operator network device, of the one or more operator network devices based on model information,
    the model information indicating allowed behavior of the particular operator network device for the QoS based service;
  monitor events at the one or more operator network devices during the session;
  detect, based on monitoring the events, that an allowable event, of the at least one allowable event, does not occur at the particular operator network device before a timeout time expires,
    the timeout time indicating an amount of time for the allowable event to occur before a fault is triggered, and
    the timeout time being based on a QoS level of the session;
  determine that the fault occurred at the particular operator network device during the session based on the allowable event not being detected at the particular operator network device before the timeout time expires; and
  provide fault information that indicates the fault occurred at the particular operator network device.

9. The computer-readable medium of claim 8, where the at least one allowable event includes at least one of receiving a first packet or sending a second packet.

10. The computer-readable medium of claim 8, where the one or more instructions, that cause the one or more processors to monitor the events, cause the one or more processors to:
monitor the events in near real time.

11. The computer-readable medium of claim 8, where the one or more instructions, when executed by the one or more processors, are further to:
detect that an unallowable event occurs; and
where the one or more instructions, that cause the one or more processors to determine that the fault occurred, are further to:
  determine that the fault occurred based on the unallowable event occurring instead of the allowable event.

12. The computer-readable medium of claim 8, where the one or more instructions, executed by the one or more processors, further cause the one or more processors to:
perform a corrective action based on the fault,
  the corrective action causing a problem that caused the fault to be corrected.

13. The computer-readable medium of claim 8, where the timeout time is one of multiple timeout times associated with the current state.

14. A method comprising:
- determining, by a device, a current state of each of a plurality of operator network devices that provide a service via an operator network,
  - the current state being associated with a session between the operator network and a client device;
- determining, by the device, at least one allowable event at a particular operator network device, of the plurality of operator network devices, based on a current state of the particular operator network device and based on model information,
  - the model information indicating allowed behavior of the particular operator network device for the service;
- monitoring, by the device, events at the plurality of operator network devices during the session;
- detecting, by the device and based on monitoring the events, that an allowable event, of the at least one allowable event, does not occur at the particular operator network device before a timeout time expires,
  - the timeout time indicating an amount of time for the allowable event to occur before a fault is triggered, and
  - the timeout time being based on a Quality of Service (QoS) level of the session;
- determining, by the device, that the fault occurred at the particular operator network device during the session based on the allowable event not being detected at the particular operator network device before the timeout time expires; and
- providing, by the device, fault information that indicates the fault occurred at the particular operator network device.

15. The method of claim 14, where the at least one allowable event includes at least one of receiving a first packet or sending a second packet.

16. The method of claim 14, where monitoring the events comprises:
- monitoring the events in real time based on a packet tracer.

17. The method of claim 14, further comprising:
- detecting that an unallowable event occurs; and
- where determining that the fault occurred further comprises:
  - determining that the fault occurred based on the unallowable event occurring instead of the allowable event.

18. The method of claim 14, further comprising:
- causing, by the device, a corrective action to be performed based on the fault,
  - the correction action causing a problem that caused the fault to be corrected.

19. The method of claim 14, where the timeout time is separate for different QoS levels.

20. The method of claim 14, where the timeout time is one of multiple timeout times associated with the current state.

* * * * *